July 5, 1927.
J. L. KIMBALL
1,634,875
REGULATOR
Filed June 1, 1925
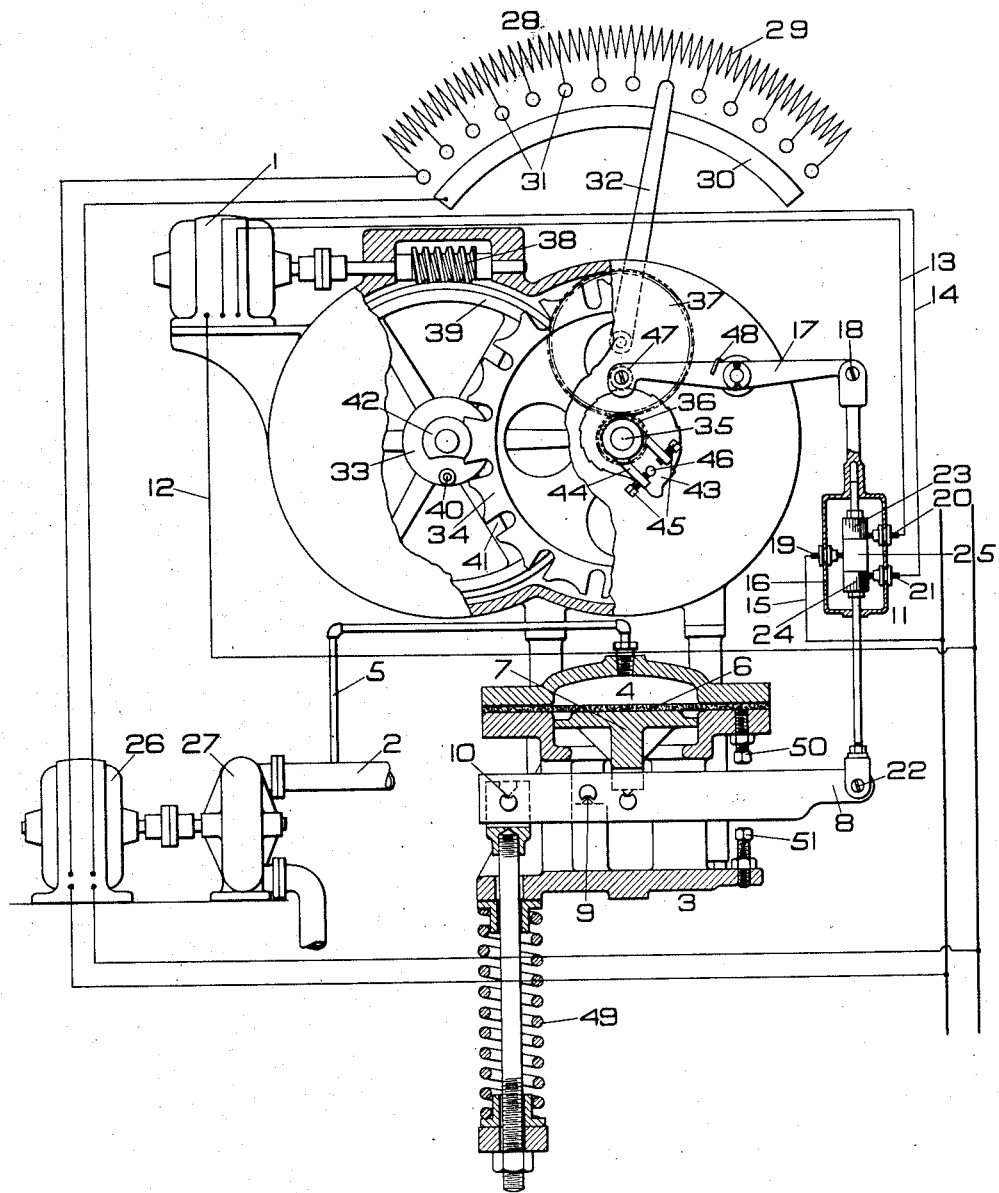
INVENTOR
James Lewis Kimball Patented July 5, 1927.

1,634,875

UNITED STATES PATENT OFFICE.

JAMES LEWIS KIMBALL, OF SALEM, MASSACHUSETTS.

REGULATOR.

Application filed June 1, 1925. Serial No. 34,039.

This invention relates to a regulator system and refers more particularly to the control of electric motor driven pumps or blowers in which the speed of a variable speed electric motor is automatically controlled to regulate the pressure in a pressure system.

The object of my invention is to operate the rheostat which controls the pump by means of a pilot motor in such a way as to effect a positive stopping of the controller arm at each speed regulating point of the rheostat.

Another object is to permit the pilot motor to be started without load torque and to allow the motor to obtain normal speed before the driving load is applied.

A further object of my invention is to provide means for effecting non-responsive periods of rest to allow the pressure in the system to become equalized before effecting further operation of the controlling means.

In regulating speed controlling resistance for variable speed motors it is desirable to stop the controller arm squarely on the speed regulating contact point, for the reason that if a firm contact is not made there will be arcing and burning of the contacts. For this purpose I have devised an intermittent driving gear which co-operates with a cut-off cam whereby the controller arm is moved rapidly from one speed regulating point to another, the arm being moved intermittently and the starting and stopping of the motor which drives the arm being effected between the operating periods of the controller arm.

It will be understood that in pressure systems there may be more or less of a time lag between the time the regulator is operated to correct the pressure, and the time the result of such operation is felt at the pressure responsive device. For this reason, it has been found desirable to operate the controlling means in steps with a predetermined period of rest between each step of operation. This rest period gives time for the pressure to become equalized in the system and to see if the correction already made is sufficient to correct the variation in demand on the system. If not, a further step of operation will take place, followed by another period of rest.

The accompanying drawing represents a diagrammatic view of a regulator system constructed in accordance with my invention.

Referring to the drawing an electrically reversible pilot motor (1) is operated in accordance with the pressure obtained in a fluid system (2). A pressure responsive device (3) has a pressure chamber (4) which is connected to the fluid pressure system (2) by means of a pipe (5). The chamber (4) is covered by a flexible diaphragm (6) which transmits variations in pressure to a pressure cap (7) which operates a lever (8) which is pivotally mounted at (9). A spring (49) is pivotally connected to the lever (8) at point (10) and provides means for counteracting the pressure in chamber (4). A switch (11) is selectively operated by the lever (8) for controlling the operation of motor (1). The switch is connected in the pilot motor circuit and controls the starting and direction of rotation of the motor. Lead (12) is connected direct to the line, while leads (13) and (14) are connected to the switch and control the direction of rotation of the motor by being selectively connected to lead (15) which connects to the opposite side of the line. The switch (11) is constructed in two parts, switch box (16) being connected to a lever (17) at point (18). This part of the switch has terminal connection (19) to which the main line connection (15) is made and terminals (20) and (21) to which the selective motor circuit wires (13) and (14) are connected. The other part of the switch which connects with lever (8) at point (22) has two insulated or non-conducting portions (23) and (24) and conducting portion (25). It will be understood that the terminals (19) (20) and (21) are electrically insulated from the switch box (16) but are in contact with the sliding element of switch. When in a neutral or open circuit position the terminal (19) is in electrical contact with the conducting portions (25) at the same time terminals (20) and (21) rest on the insulated portions (23) and (24). The construction and arrangement of the switch constitutes a follow-up system whereby the switch is alternately controlled by the pressure responsive device (3) and by the motor (1) as will be hereinafter explained. Motor (26) is connected to and arranged to drive pump (27). The speed of the pump is controlled by the rheostat (28), having resistor which is adapted to be connected through a contact segment (30) to the armature winding of the motor (26). The resistor (29) is provided with a plurality of contact terminals (31). The rheostat arm (32) is arranged to install more or less resistance in the armature circuit by being moved in either a clockwise or counterclockwise direction and thereby control the speed of motor (26). Other methods of controlling the speed of motor (26) such as controlling the field winding, or both the armature and field winding may be employed without departing from the scope of the invention.

As set forth in the statement of invention, the object of my invention is to operate a rheostat by means of a pilot motor in such a way as to effect a positive stopping of the rheostat arm at each speed regulating point of the rheostat.

To attain this object I have employed what is commonly known as a Geneva driving gear (33) which effects intermittent operation of the Geneva gear wheel (34) this wheel being mounted on shaft (35) which shaft operates the rheostat arm through either spur gears (36) and (37) or the rheostat arm may be connected direct to shaft (35).

It will be understood, however, in either case the rheostat arm (32) is insulated from shaft (35) to prevent grounding of the motor circuit. The Geneva driving gear (33) is driven by the motor (1) by means of worm (38) and worm wheel (39).

It will be understood by those skilled in the art that the driving of the wheel (34) is effected by stud (40) engaging one of the slots (41) in the driven gear (34) and the latter is thereby turned through an arc which will move the rheostat arm (32) from one speed regulating point (30) to the next succeeding point.

The driven wheel (34) is locked against rotation when the driving stud is not in mesh by means of circular locking device (42) which fits closely into the concave surfaces between the slots (41). It will be understood that the one side of the locking device (42) opposite the driving stud (40) must be relieved or cut away to release the wheel (34) during the driving period.

Mounted on shaft (35) is a stepped cam (43) and this cam is loose on the shaft, but is driven by means of driving dog (44) which is secured tight to the shaft. The amount of lost motion between the driving dog and the cam can be regulated by means of the stop screws (45). These screws (45) engage a pin (46) in driving the cam, the driving being effected by one of the stop screws as long as the rotation is in one direction only, but when the motor (1) is reversed, it momentarily stands still until the lost motion is taken up and then drives in the opposite direction. Arm (17) has a roll (47) which is held in engagement with the stepped face of the cam (43) by means of spring (48). The purpose of this arm is to effect a return of the switch box (16) to a neutral or open circuit position in relation to the sliding element of the switch thereby effecting cut-off action and a stopping of the motor (1) at each stepped position of the cam. It will be understood that the cut-off action is effected in one direction by the roll engaging a higher stepped position on the cam, and in the other direction by engaging a lower stepped position. The purpose of the lost motion in driving the cam is to compensate for these variations in the cut-off point when the motor is reversed. Even with means to effect the same cut-off point on a clockwise and a counterclockwise direction of rotation of shaft (35) it is impossible because of the variable drifting characteristics of the motor to effect a stopping of the rheostat arm on each speed regulation contact point (31). For this reason one of the objects of my invention resides in effecting a starting and stopping of the motor between the intermittent driving periods of the rheostat arm and in this way variations in the cut-off point of the motor caused by variations in the drift of the motor after cut-off has been effected, will not interfere with stopping at each speed regulating point.

One of the objects of my invention being to effect period of rest to compensate for time lag in the pressure system. It will be seen that after the motor 1 ceases to drive the controller arm 32, that regardless of whether the change in pressure in the system was of a value corresponding to one or more steps from its mean average, there will be a period of rest to permit the pressure in the system to become equalized before a further operation can take place. If the degree of variation of pressure in the system, due to variation in demand, was the equivalent of one step of operation only, then at the end of that step of operation, motor 1 would be stopped until a further variation in demand took place. But on the other hand, if the variation from the mean average pressure was the equivalent of several steps of operation, then there would be a period of wait between every step of operation to see if what had been accomplished was sufficient after the pressure had become equalized in the system and the diaphragm 6 had responded to the equalized pressure. It will be understood that if it were not for these periods of rest that the regulator might effect such rapid changes as to cause overcorrection before the pressure could be equalized and the true pressure felt on the diaphragm 6. This would result in a continuous hunting action back and forth which would not only unnecessarily wear out the controlling apparatus, but would result in fluctuation of the pressure in excess of the variation in demand.

The operation of the invention as above outlined is as follows:—The regulator being adjusted by means of counteracting spring (49) for a pre-determined pressure setting, variations in pressure acting on diaphragm (6) move lever (8) and the sliding element of the switch (11) to either one of its two closed circuit positions which operates the motor. Assuming an increase in pressure then switch (11) will be selectively operated to pass current from the main line to terminal (19) thence by means of conducting portion (25) to motor terminal (21) which operates the motor in the direction to install additional resistance in the armature circuit and thereby retard the speed of the motor (26). As soon as the motor (1) attains full speed the stud (40) engages one of the slots (41) and the rheostat arm is moved from one speed regulating point to another and driving ceases. As soon as driving ceases, then the cam (43) comes into action, the roll (47) assuming a higher stepped position which rocks lever (17) lowering the switch box and selectively returning the switch (11) to a neutral position or open circuit position. It will be seen that after the switch is moved to its open circuit position any drift of the motor is lost motion which will not affect the position of the rheostat arm (32). Likewise on a decrease in pressure on diaphragm (6) current will flow from main line to terminal (19) thence by conducting portion (25) to motor circuit (20) which operates the motor in the opposite direction to cut out resistance, and if the cam was solid on the shaft would only operate from its higher position to the next lower position which distance is less than the full angle of rotation between steps. Therefore, it is necessary to provide a lost motion so that said lost motion plus the distance travelled to effect cut-off action will be equal to one full stepped action when travelling in one direction only. After the lost motion has been taken up and the cam moved to a lower stepped position, arm (17) will be rocked to raise switch box (16) and thereby return the switch again to its neutral or open circuit position. The driving period having been completed before the cut-off action takes place, it will be seen that the rheostat arm will be locked on one of its speed regulating points and any variation in cut off or motor drift will not affect its position.

It should be understood that the shaft (35) is operated through any number of degrees not to exceed a complete revolution and that its limits of operation are controlled by the limits of operation of the lever (8) and that the limits of operation of lever (8) are controlled by the adjustment of the limit screws (50) and (51).

It will now be seen by those skilled in the art, that I have devised new and useful improvements for the control of rheostats and the like and that certain modifications in the system and in the arrangement of the parts may be made within the scope of my invention.

What I claim as new and desire to secure by Letters Patent of the United States is:—

1. In a regulator, a controlling device, a motor and means connecting the motor with the controlling device to effect the operation of the controlling device at predetermined points in the operation of the motor, said motor having an effective period of operation in which it operates the controlling device, and a non-effective period of operation, in which the motor is disengaged from the controlling device, means to effect the starting and stopping of motor during the non-effective period of operation of the controlling device.

2. In a regulator, a controlling device, a motor and means connecting the motor with the controlling device to effect the operation of the controlling device at predetermined points in the operation of the motor, said motor having an effective period of operation in which it operates the controlling device, and a non-effective period of operation, in which the motor is disengaged from the controlling device, means to effect the starting and stopping of motor during the non-effective period of operation of the controlling device, and an automatic locking device to prevent the controlling device from being manually or accidentally operated during the non-effective operating period of the motor.

3. In a fluid system, a motor for controlling the condition of the fluid in the system, a controlling device for controlling the motor, a second motor for controlling the controlling device, means connecting the last named motor with the controlling device to effect the operation of the controlling device at predetermined points in the operation of the motor, said motor having an effective period of operation in which it operates the controlling device, and a non-effective period of operation in which the motor is disengaged from the controlling device, means effective on variations in the condition of the fluid in the system above and below normal to start and stop the motor, the starting and stopping of the motor being effected during the non-effective period of operation of the controlling device.

4. In a regulator, a controlling device, a motor and means to operate the controlling device intermittently from a continuous operation of the motor, automatic means to effect the starting and stopping of the motor during the non-effective period of operation of the controlling device, and means to automatically lock the controlling device to prevent it from being manually or accidentally operated during the non-effective period of operations of the motor.

5. In a regulator, a reversible motor, a controlling element for said motor, said element having a neutral position in which the operation of the motor is not effective and two effective positions in which the operation and direction of operation of the motor is effected, automatic means to operate the controlling element to either of its effective positions and a step cam member operated by the motor to return the controlling element to its neutral position at uniformly spaced positions in the operation of the motor, said cam being operated by a predetermined lost motion in which the relative position of the cam is changed to compensate for variations in the cut-off action of the cam when the motor is reversed.

6. In a regulator, a controlling device, a reversible motor for effecting operation of said device, means connecting the motor with the controlling device for effecting an intermittent operation of the controlling device, and means to intermittently operate said motor, said means being arranged to permit the motor to be started without load torque, the starting and stopping or reversing of the motor being effected between the intermittent stages of operation of the controlling device.

7. In a regulator, a controlling device, a reversible motor for effecting operation of said device, an operating element for controlling said motor, said element having a neutral position in which the motor is ineffective, and two effective positions in which the operation and direction of operation is controlled, means to operate said element to either of its effective positions to operate the motor, and a cam member having a plurality of steps for returning the element to its neutral position at each stepped position, said cam being operated by the motor but with a lost motion in which the position of the cam is changed to compensate for variations in the cut-off action of said cam when the motor is reversed.

8. In a pressure system, means for controlling the pressure in the system, an electrically reversible motor for operating the pressure controlling means, a supply circuit for said motor, a switch in said supply circuit, said switch having a neutral position in which the operation of said motor is not effective, and two effective positions for operating said motor in either direction, a pressure responsive device for operating said switch, said pressure device maintaining said switch in its neutral position when the pressure in the system is at a mean average value, and arranged to move said switch to either of its effective positions when the pressure changes from its mean average value, means to intermittently stop the further operation of the pressure controlling means at predetermined points and for predetermined periods of time regardless of the variation in pressure from its mean average value, to permit the pressure to become equalized in the system before proceeding to a further correction.

9. In a pressure system, a controlling device, a motor and means connecting the motor with the controlling device to effect the operation of the controlling device at predetermined points in the operation of the motor, a controlling element for said motor, a pressure sensitive device responsive to pressure variations of the system for operating said controlling element for starting the motor, and a cam member for rendering the controlling element inoperative to further operate the motor at each predetermined point in the operation of the controlling device, and to await a further variation in pressure acting on the pressure sensitive device for a further operation of the motor.

10. In a pressure system, a controlling device, an electrically reversible motor, and means operated by the motor for effecting operation of the controlling device, a supply circuit for said motor, a two way switch having a main element for supporting terminal connections and contacting brushes, a sliding contacting element for slidably engaging said contacting brushes, said sliding element having a central position in which the motor circuit is open and two end positions in which the sliding element contacts with the terminal brushes for effecting the operation of the motor and its direction of rotation, a pressure sensitive device responsive to variations of pressure in the system for operating the sliding element to either of its end positions to close the motor circuit, and a cam member operated by the motor for moving the main element away from the sliding element and tending to keep the sliding element in a relatively central open circuit position in relation to the main element.

11. In a fluid system, a reversible motor and means operated by said motor for controlling the condition of the fluid in the system, governing means for said motor, said governing means comprising two elements, said elements having a relatively neutral position at which the operation of the motor is not effective and two relatively effective positions for operating the motor, a device responsive to variations in the condition of the fluid for operating one of said elements to either of its effective positions, said device co-operating with means for operating the other element to cause a step and stop operation of the motor, and means to effect a predetermined period of rest between the steps of operation to permit the condition of the fluid to become equalized in the system before proceeding to a further step of operation.

12. In a pressure regulator system, an electrically reversible motor for controlling the pressure, a supply circuit for said motor, a switch in said supply circuit, said switch having two movable elements, said elements having a relatively neutral position in which the operation of the motor is not effective, and two relatively effective positions for operating the motor, a pressure sensitive device for operating one of said elements to either of its relatively effective positions, and means to operate the other element to cause step and stop operation of the motor in either direction, and means to effect a predetermined period of rest between the steps of operation to allow the result of the last step of operation to become effective at the pressure sensitive device before proceeding to a further step of operation.

JAMES LEWIS KIMBALL.